April 1, 1924.

J. W. LEE 1,489,081

PAPER CUTTING MACHINERY

Filed March 4, 1922

INVENTOR
By J Wesley Lee
Frank Schraeder Jr
Attorney

April 1, 1924.
J. W. LEE
1,489,081
PAPER CUTTING MACHINERY
Filed March 4, 1922
3 Sheets-Sheet 2
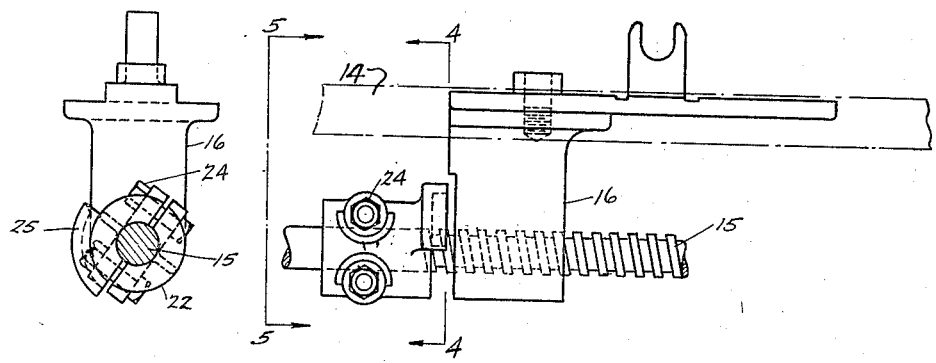
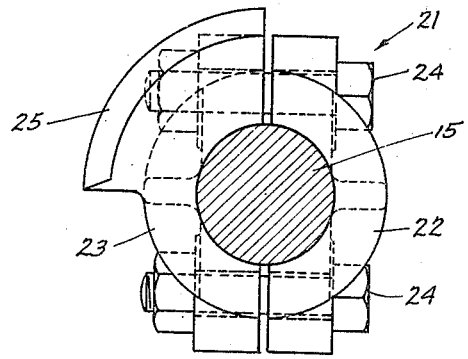
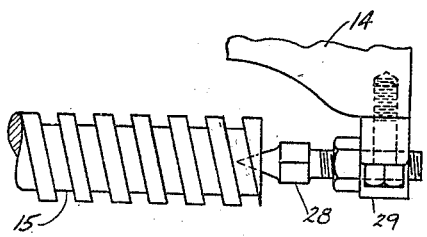
INVENTOR
J. Wesley Lee
By Frank J. Schraidt Jr.
Attorney April 1, 1924.

J. W. LEE 1,489,081

PAPER CUTTING MACHINERY

Filed March 4, 1922   3 Sheets-Sheet 3

INVENTOR
J Wesley Lee
BY
Frank J Schraeder
Attorney

Patented Apr. 1, 1924.

1,489,081

UNITED STATES PATENT OFFICE.

JAMES WESLEY LEE, OF GRAND HAVEN, MICHIGAN, ASSIGNOR TO THE CHALLENGE MACHINERY COMPANY, OF GRAND HAVEN, MICHIGAN, A CORPORATION OF MICHIGAN.

PAPER-CUTTING MACHINERY.

Application filed March 4, 1922. Serial No. 541,015.

*To all whom it may concern:*

Be it known that I, JAMES WESLEY LEE, a citizen of the United States, residing at Grand Haven, in the county of Ottawa and State of Michigan, have invented a new and useful Improvement in Paper-Cutting Machinery, of which the following is a specification.

The invention relates to paper cutting machines and concerns more particularly the provision of a gauge which may be adjusted by means of a screw spindle.

It is an object of the invention to provide a back gauge which may be adjusted throughout its range of movement without being able to occupy an oblique position.

A further object of the invention constitutes the provision of means for preventing tilting of the gauge upon reaching a terminal position.

A still further object aims at providing means for locking the gauge in terminal position.

To the accomplishment of the object stated, and others that will become apparent from the following description, the invention comprises the means described in the following specification, particularly pointed out in the claims forming a part thereof and illustrated in the accompanying drawing, in which:

Fig. 3 is a fragmentary detail view;

Fig. 4 is a section on the line 4—4 of Fig. 3;

Fig. 5 is a section on line 5—5 of Fig. 3, showing the stop in locked position with the gauge slide.

Fig. 6 is a fragmentary detail view of the outward end of the screw spindle and the cooperating pivot bearing;

Figure 2:
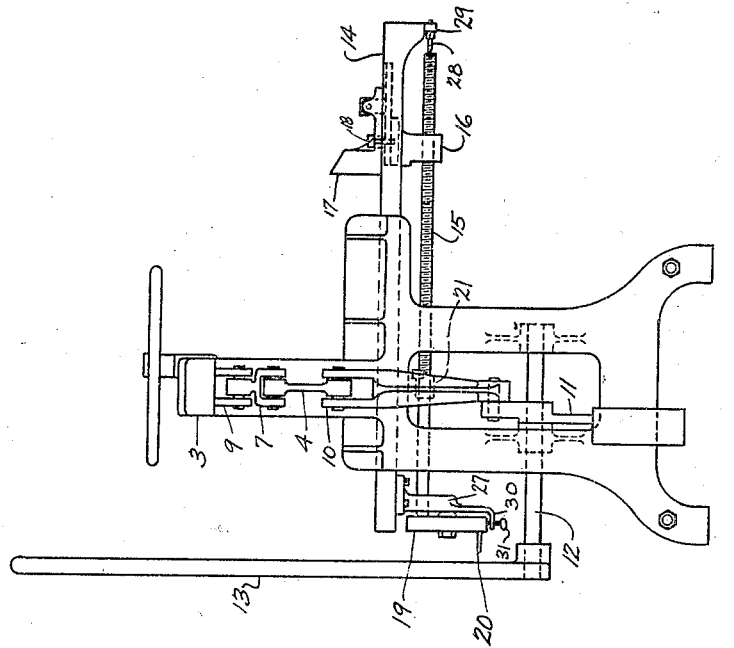
Fig. 2 is a side view of the machine.
Figure 1:
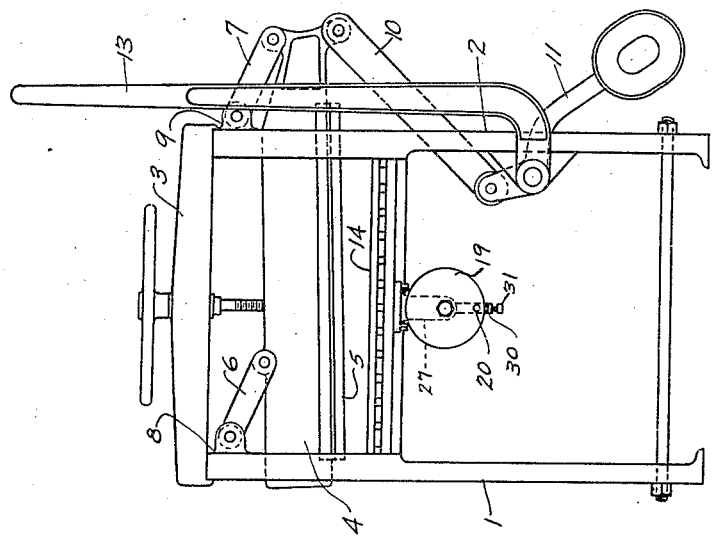
Fig. 1 is a front view of a paper cutting machine to which the invention has been applied.
Figure 7:
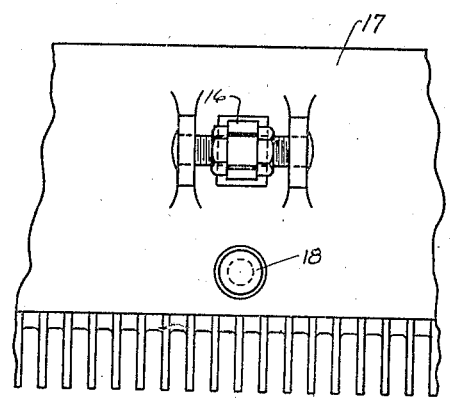
Fig. 7 is a top plan view of a back gauge.
Figure 8:
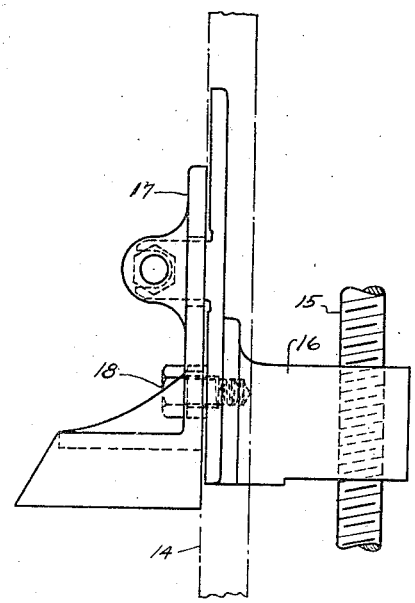
Fig. 8 is a side view of parts shown in Fig. 7.
Figure 9:
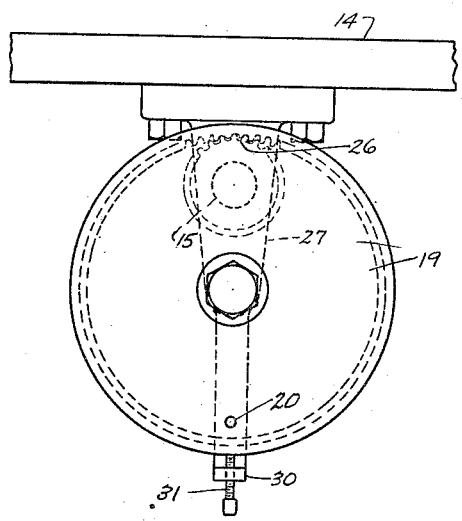
Fig. 9 is an end view of the screw spindle and associated parts.
Figure 10:
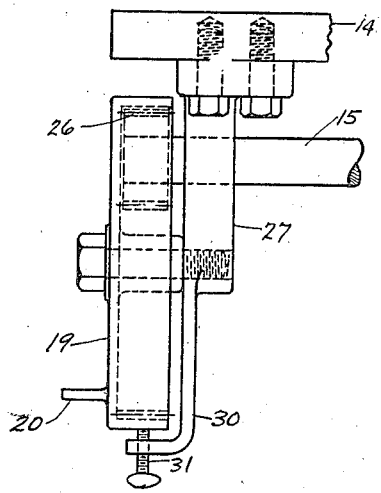
Fig. 10 is a side view of the parts shown in Fig. 9.

Referring to the several views of the drawing, 1 and 2 designate the side frames of the paper cutting machine and 3 denotes the top frame which connects the side frames. A knife holder 4, provided with a knife blade 5, is oscillatorily mounted and is suspended from the frame by links 6 and 7, which are pivotally secured to lugs 8 and 9 of the side frames 1 and 2 and to lugs of the knife holder respectively. A comparatively long link 10 is pivotally attached to the lower corner of the knife holder, and the other end of said link is articulated with the upper extremity of a weighted lever 11 pivotally secured at an intermediate position to the side frame 2.

A shaft 12 carries the lever 11, and the left extremity of the shaft 12, as viewed in Fig. 2, has secured thereto a hand lever 13 for the actuation of the knife holder. As will be readily seen, upon movement of the hand lever toward the center of the machine, the link 10 is forced downwardly, and concomitantly therewith the knife holder executes a longitudinal movement and cooperates thereby with a bed plate 14 on which the paper to be cut is arranged. Underneath the bed plate a screw spindle 15 is provided and journaled in a number of dependent bearings for a purpose presently to be described.

As shown in Fig 2, the left end of the screw spindle 15 is arranged in a dependent bearing 27, whereas the opposite end is sustained by a pivot bearing 28, shown in detail in Fig. 6. On the spindle 15 travels a slide 16 to which is secured a back gauge generally designated by 17 by means of a screw 18. At the forward end of the screw spindle 15 a gauge screw wheel 19 is provided, equipped with a handle 20. The wheel 19 is constructed as an internal gear, the teeth of which mesh with a gear 26 fast on the inner extremity of the screw spindle 15.

From the foregoing it follows that upon rotation of the wheel 19 the screw spindle 15 is turned in one or the other direction, whereby the gauge is either advanced or repelled. In order to lock the wheel 19 against rotation when the gauge has reached a desired position, an arm 30, forming the extension of drop bearing 27, is curved to extend underneath the wheel 19 and carries a set screw 31, which may be adjusted to bear on the wheel 19 or to release the gauge. It has been observed that when the back gauge reaches the extreme left position, as viewed in Fig. 2, the slide 16 abutting with the smooth portion of the screw spindle will cause tilting of the gauge. In order to prevent such tilting and consequent disalignment of the sheet of paper contacting with the back gauge, a stop is provided at the inner end of the screw spindle which enters into abutting relation with the slide 16 so as to insure the proper positioning of the gauge even in the end position.

The stop, generally designated by 21, comprises half portions 22 and 23 which are arranged around the smooth portion of the spindle 15 and are secured together by bolts 24 and clamped to the spindle. The part 23 is provided at the periphery with an arcuate flange 25 extending over an arc approximately 90° and adapted to engage the slide 16 of the gauge 17 when the latter reaches the left end position.

As will appear more particularly from Figs. 3 and 5, the slide 16, upon reaching the inner terminal position, will abut with the stop and the latter will occupy a position in which the arcuate flange 25 overlaps and grips a side of the slide, whereby the latter becomes locked against further movement and at the same time the back gauge cannot tilt.

No attempt has been made to describe irrelevant parts of the machine, as it is believed that the same will be readily understood by those versed in the art. Only so much of the machine has been described as is necessary for an understanding of the invention as defined in the appended claims.

I claim:

1. In a paper cutting machine, in combination with the bed plate, a gauge slidable thereon, means for adjusting said gauge, and means fast on said first mentioned means for preventing angular positioning of said gauge.

2. In a paper cutting machine, in combination with the bed plate, a gauge slidable thereon, a screw spindle underneath said bed plate for adjusting said gauge, and means on said spindle for arresting said gauge and preventing tilting of said gauge in the end position.

3. In a paper cutting machine, in combination with the bed plate, a gauge slidable thereon, a screw spindle underneath said bed plate, a nut traveling on said spindle and connected with said gauge, and means on said spindle for arresting said nut and thereby preventing tilting of said gauge in the end position.

4. In a paper cutting machine, in combination with the bed plate, a gauge slidable thereon, a screw spindle underneath said bed plate for adjusting said gauge, and means on said spindle for arresting and locking said gauge against movement to thereby prevent tilting of said gauge.

5. In a paper cutting machine, in combination with the bed plate, a gauge slidable thereon, a screw spindle underneath said bed plate, a slide traveling on said spindle and connected with said gauge, and a stop fast on said spindle and adapted to engage said slide to thereby arrest said gauge and prevent tilting thereof.

6. In a paper cutting machine, in combination with the bed plate, a gauge slidable thereon, a screw spindle underneath said bed plate and traversing through an extension of said gauge, a drop bearing for one end of said spindle, a pivot bearing for the opposite end of said spindle, and a stop fast on said spindle and adapted to engage said gauge and thereby secure the same against tilting.

7. In a paper cutting machine, in combination with the bed plate, a gauge slidable thereon, a screw spindle underneath said bed plate and traversing through an extension of said gauge, bearings for said spindle, a handle wheel constructed as an internal gear rotatably secured to one of said bearings, a gear secured to said spindle and meshing with said wheel, and a stop fast on said spindle and adapted to engage and hold said gauge against tilting.

In witness whereof, I have hereunto subscribed my name this 24th day of February, 1922.

J. WESLEY LEE.